United States Patent
Lebron et al.

(10) Patent No.: US 10,614,697 B2
(45) Date of Patent: Apr. 7, 2020

(54) LIFE DETECTION AND PRESERVATION SENSOR

(71) Applicant: Zomio Inc., Yauco, PR (US)

(72) Inventors: Ishmael Isaac Lebron, Yauco, PR (US); Zenymar Salgado, Yauco, PR (US); Raul Valle, Dorado, PR (US)

(*) Notice: Subject to any disclaimer, the term of this patent is extended or adjusted under 35 U.S.C. 154(b) by 9 days.

(21) Appl. No.: 16/133,459

(22) Filed: Sep. 17, 2018

(65) Prior Publication Data

US 2019/0088103 A1 Mar. 21, 2019

Related U.S. Application Data

(60) Provisional application No. 62/559,506, filed on Sep. 16, 2017.

(51) Int. Cl.
| | |
|---|---|
| *G08B 21/22* | (2006.01) |
| *G08B 21/24* | (2006.01) |
| *G08B 21/02* | (2006.01) |
| *G06K 9/00* | (2006.01) |

(52) U.S. Cl.
CPC ......... *G08B 21/22* (2013.01); *G08B 21/0225* (2013.01); *G08B 21/0277* (2013.01); *G08B 21/0283* (2013.01); *G08B 21/24* (2013.01); *G06K 9/00496* (2013.01); *G06K 9/00838* (2013.01)

(58) Field of Classification Search
CPC .... G08B 21/02; G08B 21/22; G08B 21/0225; G08B 21/0469
See application file for complete search history.

(56) References Cited

U.S. PATENT DOCUMENTS

2013/0070043 A1* 3/2013 Geva ................... B60K 28/066
348/14.02

* cited by examiner

*Primary Examiner* — Curtis B Odom
(74) *Attorney, Agent, or Firm* — Eugenio J. Torres-Oyola; Victor M. Rodriguez-Reyes; Ferraiuoli LLC

(57) ABSTRACT

The present disclosure relates to a sensor system to detect life inside a vehicle comprising a sensor fir detecting vehicle movement, a sensor for detecting movement inside the vehicle and several sensors to detect that the environment conditions, such as temperature and air, inside the vehicle are within accepted parameters such live beings inside the vehicle are not in danger when left unattended.

14 Claims, 3 Drawing Sheets

LIFE DETECTION AND PRESERVATION SENSOR

PRIORITY

This application claims priority from U.S. Provisional Patent Application No. 62/559,506, filed on Sep. 16, 2017.

BACKGROUND

The following application is related to the field of sensors to detect life inside the confined space of a car.

Every year, people, children and pets die because they are left unattended inside vehicles where temperatures can dramatically increase or decrease, causing severe physical damage or death. These deaths are barely ever premeditated or the result of malicious intent. Most people step out of the vehicle knowing that they left life inside it but they believe they will do whatever they need to do quickly and be back before anything happens. Distractions like getting caught up in a conversation could cause a person to lose track of time, exposing the life inside the vehicle to greater harm.

Some new parents or pet owners are not accustomed to the daily routine a parent should have when it comes to checking the rear seat or area of the vehicle. The life inside the vehicle can fall asleep and not make any sounds or noise, making the parent or owner unaware that they have a pet or a baby inside the car. They leave the car and go to work or to do their daily activities and expose the baby or pet to dramatic changes in temperature, causing harm or death to the life.

There are also cases where caregivers are with seniors or disabled people. Because they are adults and not children, the caregiver can have the false impression that they can withstand dramatic changes in temperatures and will not be harmed by any changes, leaving them unattended inside the vehicle while they perform their daily task. But just like infants and pets, these changes can severely affect these adults, causing harm or death. Some of these people do not have the ability to perform actions like opening a door or lowering a window. Some might not be able to make a call or ask for help from bystanders.

An average of 30% of children that die inside vehicles are children that went inside a vehicle that was parked at their home or somewhere they had access to it, to get a toy or play inside, and became trapped inside it with no means to get out. This mostly happens when parents, believing they are doing the right thing, use child locks on vehicle doors so children sitting in the back of the vehicle can't open them from the inside. Unfortunately, these children that have access to the vehicles, go inside and shut the door and can't come back out. Because these children in most cases are unattended, parents don't know the child went outside and got inside the vehicle. Parents believe the child is inside playing and are not aware that the child has gone outside. These children inside the cars are exposed to dramatic changes in temperatures and die.

Many more die due to an increase of CO2 levels inside vehicles without people noticing. This mostly happens when people leave running vehicles inside closed garages with life inside. Because there is no ventilation, levels of CO2 increase and cause death. Unfortunately, a great amount of people believe that having the air conditioner on will somehow filter the CO2 gas and maintain harmless levels. But this is not true because vehicle air conditioning systems are not designed to filter CO2 gas, just to provide cold air by getting air from the outside and cooling it down without filtration. If the levels of CO2 are increasing outside or are already high, the air conditioning unit will suck in that air and pump it into the vehicle which will cause severe harm or death to the life inside.

Therefore, there is a need for a system that can detect life inside a parked vehicle and that helps prevent harm or death to live beings that cannot act on their own.

DESCRIPTION OF THE PRIOR ART

U.S. Pat. No. 9,761,108 discloses an apparatus for monitoring positions of objects using an imaging device, such as a camera, to detect if an object or person is within a specific field of vision. This solution lacks elements that determine if a person or child is inside the car and if the conditions inside the car are dangerous.

U.S. Pat. No. 9,953,230 discloses a system for monitoring the inside of a car by detecting if the temperature is above a certain threshold and taking pictures to determine if there has been movement. This solution does cannot determine if there is life inside the car too accurately, as children in a car are usually on a car seat, which does not allow for much movement. Furthermore, if a child or animal inside a car is asleep or unconscious, the system may not detect them. This system is also dependent on being installed as part of the car, as the temperature sensor is activated when the ignition switch is turned on. Therefore, it cannot be used in older cars.

U.S. Pat. No. 10,040,422 discloses another solution for the problem of forgetting about unattended children in cars. However, this solution is tied to the seatbelt of the car and does not determine if the child is in danger, as it only provides an audible notification when a seatbelt buckle is disengaged.

Additional prior art is available, but are redundant in the sense that they need to be installed during fabrication of the vehicle and require additional steps to engage. Most focus on car seats and others on controlling the automobiles electronics, which could lead to failure. The present invention is a standalone system that can be used in older or newer vehicles and can be moved from one vehicle to another.

BRIEF SUMMARY

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

When the word "invention" is used in this specification, the word "invention" includes "inventions", that is, the plural of "invention". By stating "invention", the Applicant does not in any way admit that the present application does not include more the one patentable and non-obviously distinct invention and Applicant maintains that the present application may include more than one patentably and non-obviously distinct invention. The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The following application discloses a method and system for detecting life inside a vehicle. It provides a solution for the current problem of people or animals left unattended inside a car suffering harm or death as a result of being exposed to extreme temperature or levels of CO2.

The purpose of the present invention is to save the life of unattended lives inside vehicles. The life, being either animal or human, is instantly in danger the moment the caregiver leaves the vehicle, even if they believe it will be for a short time. If the vehicle is off and all windows and doors closed, temperatures can increase by 10 degrees within the first 5 minutes on a normal day that is 75 degrees outside, and as much as 80% increase in temperature within the first 10 minutes. If temperatures are greater outside, this increase in temperatures will happen even quicker. Because this increase happens so quickly, no time can be wasted in trying to preserve life inside a vehicle.

In some embodiments, the present invention works by sending notifications and alarms when conditions inside the vehicle are met.

In some embodiments, the present invention works by communicating with an EMS to notify them about a person or animal in danger inside a vehicle.

In some embodiments, the present invention allows for a user to set specific temperatures, CO2 levels, and other environment conditions to be notified.

In some embodiments, the present invention comprises a solar panel to keep the system battery charged, reducing the amount of time that the system is inactive.

In some embodiments, the present invention may interact with a mobile device, such as a smartphone, to configure the system.

In some embodiments, the present invention may notify a user when a wireless connection between the user's mobile device and the vehicle or another device inside the vehicle is lost.

In some embodiments, the present invention may comprise a screen or touchscreen to configure the system.

In some embodiments, the present invention may comprise a high intensity speaker for notifying nearby people about a person or animal in danger inside a vehicle.

In some embodiments, the present invention may comprise a microphone in order to receive commands.

DETAILED DESCRIPTION

Figure 1:
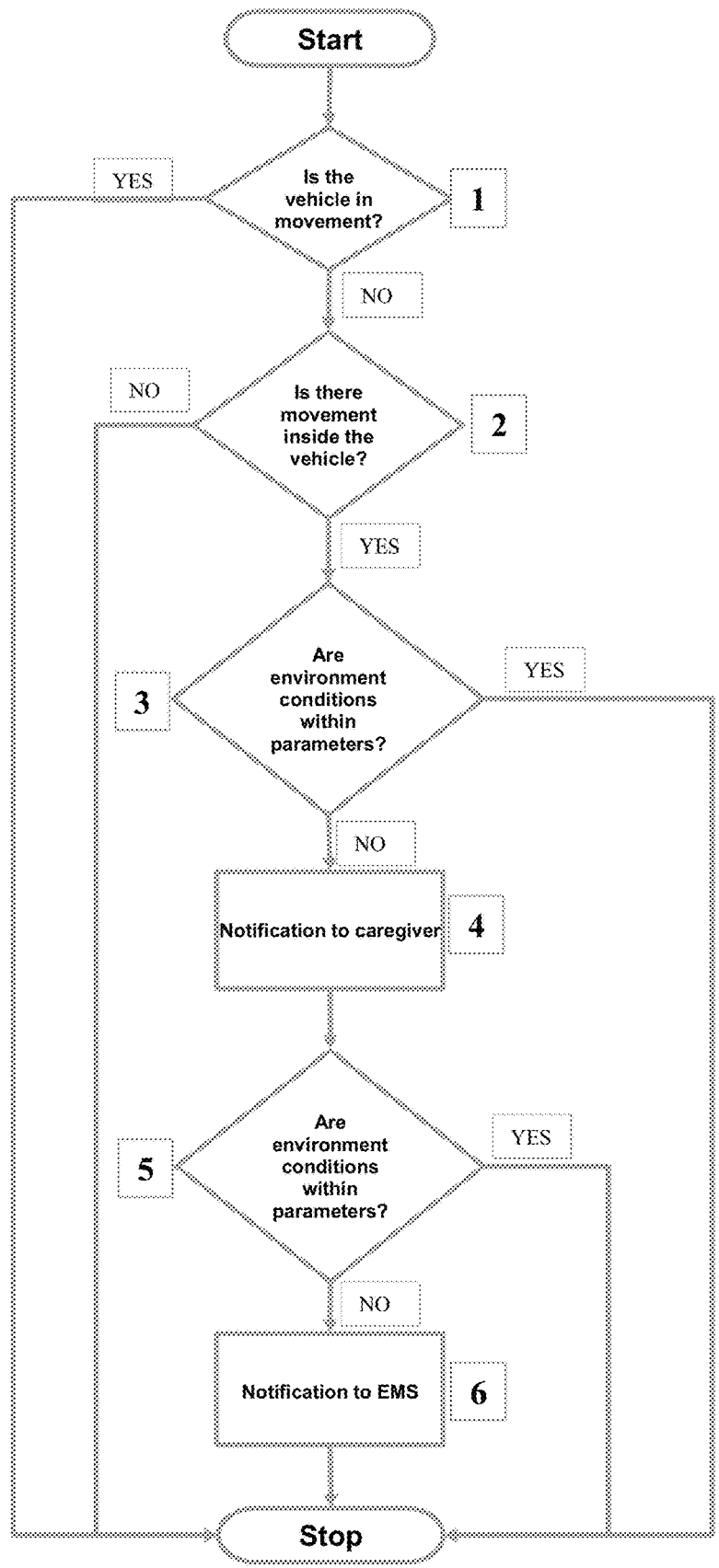
FIG. 1 illustrates a flowchart of the process for determining if a notification should be sent and whether to contact an EMS.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. For purposes of uniformity and clarity in this application, the following terms are to be interpreted as follows when used throughout the specification:

Life: The term "Life" is used in reference to both human and animal life. The present invention detects both life forms and works to preserve their life.

Caregiver: A caregiver is the designated person or persons that are responsible for the wellbeing of the life inside the vehicle. Caregivers can be the parents of children or teens, the owners of a pet, the person responsible for a disabled adult or senior and others.

Vehicle: Refers to all passenger vehicles where people are present. This includes: compact cars, mid-size cars, full size cars, sports cars, cross over SUV, small SUV, mid-size SUV, full size SUV, pickup trucks, mini vans, passenger vans, Recreational Vehicles (RV), passenger buses, school buses, cargo trucks and all over type of vehicles that require a driver and may or may not have a passenger seat.

EMS: Emergency Management Services, this includes Police, Ambulance, Fire Department, 911 and all rescue services available.

An important component of the present invention is an Ultra-Wideband (UWB) radar sensor. Ultra-wide band sensors are sensors that utilize low frequencies of radar that can penetrate almost any material. When calibrated, an ultra-wide band sensor can detect the most subtle and minimum movements such as movements of the chest caused by breathing and beating hearts of life forms through materials such as concrete, wood and some types of metals. This ability is essential to the present invention. Utilizing this sensor gives the present invention the ability to detect life presence through common materials that are found inside a vehicle such as: foam, leather, cloth, plastic, and through car seats. This means that if a child or pet is sitting behind the driver in a blind spot, the ultra-wide band sensor can detect their presence even if the driver does not notice it. The present invention comprises an UWB sensor that can detect faint movements even through objects. Because this sensor alone can create false alarms based on movements outside of the car or because of the simple fact that a person in the car alone for a short time does not mean the person is in danger, it is necessary to connect this sensor with a set of other sensors that can eliminate false alarms and increase the reliability of the system.

The leading cause of child deaths in cars is because of extreme heat. Because the UWB sensor cannot detect heat signatures or levels, it is necessary to have a separate temperature sensor to measure the heat or cold levels inside the vehicle. A temperature sensor is a sensor that has the ability to measure any changes in temperature, whether an increase or a decrease in temperature. The temperature sensor will be able to detect these changes and assist in preventing any harm or death inside the vehicle. Heat strokes usually begin when body temperature reaches about 104 degrees Fahrenheit. In a normal day when its 72 degrees outside, it takes about 1 hour for the inside temperature to reach the 104 degrees, for a total of a 32-degree increase in one hour. This means that in 15 minutes, the temperature inside the car can increase by 8 degrees. This increase is still dangerous even if it does not reach 104 degrees. Therefore, the temperature sensor will have an operating limit, for example, of about 5 degrees up or down. This means that if the temperature drops by 5 degrees or increases by 5 degrees, its part will trigger an alert.

Another indicator, besides temperature and movement, that a person can be in danger inside a car is the $CO_2$ levels within the car. A $CO_2$ sensor is a sensor that can detect changes in $CO_2$ levels utilizing the scale of PPM (Parts Per Million). $CO_2$ is a common gas that is found naturally in the air. This gas is not harmful if it is inhaled within a range of about 200-400 PPM. But $CO_2$ become dangerous once its concentration levels begin to increase. $CO_2$ is known as "the silent killer," as most people do not realize any changes in $CO_2$ and don't realize they're in danger. Increases in $CO_2$ can cause drowsiness, feeling tired or falling asleep. Unfortunately, life dies inside running vehicles due to $CO_2$ poisoning because people leave pets, children or even adults inside running vehicles in a closed area like a closed garage, and forget or take too long to return. Because vehicles emit high concentrations of $CO_2$, poisoning can occur quickly without people noticing. Another leading cause of death for children and people inside cars are those who are left inside cars in their homes garage when it is closed. This usually happens when you live in a cold area and you start your car in the garage so it could warm up and you leave your kids inside. You may take too long or forget, and your child or pet dies because of Carbon Monoxide poisoning. Utilizing a $CO_2$ sensor can detect these rapid changes and help alert and preserve life. Further, if a person is locked in a car and the temperature begins to rise, the person begins breathing harder which contributes to the $CO_2$ levels inside the car rising, giving an indicator that the person being detected by the UWB may be in danger. With the $CO_2$ sensor, even if the temperature doesn't rise, the $CO_2$ sensor can detect the dangerous rise in $CO_2$ levels and help prevent a death.

All previous sensors help detect changes in the environment inside the car. But because the purpose of the present invention is to prevent deaths when people or pets are left alone in a car, the system must be able to track the vehicle's movements to determine if the car has stopped. A Global Positioning System (GPS) is a device that communicates with Global Positioning Satellites in order to identify a location and can also be used to detect movements via satellites. For the purpose of the present invention, the GPS device will be used as a tool to detect if a vehicle is stopped and not in movement. It will also be used to obtain an exact location of the vehicle in case the location has to be relayed to EMS. Because the system is not to be directly connected to the car, it cannot determine if the car is on or off or in parking or drive. To be able to determine the car's status to make the sensor work effectively, the system needs another way to know if the person in the car is alone and that is by tracking its movements. Triggering of the alarm and notifications will only be allowed once the vehicle's movements have been taken into consideration. In essence, the accelerometer or GPS is the gate keeper and no alarms or notices get through unless the car has been stationary for a certain amount of time. For example: the temperature increases 5 degrees and the $CO_2$ levels remain more or less the same with little increase, but since the car is moving, no alarm is set off. But if the degrees go up by 5 degrees, the car has had no movement for a certain amount of time and there is a slight change in $CO_2$, because the car hasn't moved and the temperature has passed the set limits, the alarm is triggered and the notifications are sent. None of the sensors can trigger the alarm by itself. In an embodiment comprising UWB sensor, a heat sensor, a $CO_2$ sensor, and GPS, out of the 4 sensors, 3 are always needed to set off an alarm. Out of the 3 that are always needed, 2 are always permanent. The UWB radar (presence detection sensor) and the GPS. If there is no movement or presence detected, no alarm is set off. This means that these 2 sensors must always be triggered for an alarm to be set off. Once these 2 conditions have been met, if the temperature sensor changes and/or the $CO_2$ sensor detects increases in its levels, the sensors requirements have been met and the alarm is set off.

Accelerometers may also be used with embodiments of the present invention to track movements inside the car. The $CO_2$ sensor may be replaced with an air quality sensor that takes into consideration other gases and air quality conditions that could be harmful to the life inside the vehicle.

As shown in FIG. 1, in a preferred embodiment of the present invention, first the system will determine if the car is moving by using the GPS unit 1. This is important because in order to eliminate false positives, the system has to determine that the vehicle is not in motion to be considered parked and unattended. Once it is determined that the car is not moving, the UWB sensor will have to detect life presence in the vehicle 2. If there is no life presence in the vehicle, no alarms or notifications will be triggered. Once the GPS determines that the vehicle is not in motion and the UWB sensor detects life, there will be a time limit in which the temperature sensor and the $CO_2$ sensor will monitor for changes in the vehicle's interior without setting off any alarm or notifications. A minimum time of non-motion is configured to be able to eliminate further false positives like a vehicle at a stop light or waiting for a train to pass.

After the initial configured minimum time has passed, if temperatures or $CO_2$ levels inside the vehicle have increased according to the configured parameters, with no vehicle movement and life detections 3, the system will automatically send notifications to the caregivers of the life 4. After the first notification is sent out, if temperatures or $CO_2$ levels continue to increase, a second and final notification will be sent to the caregivers. If temperatures or $CO_2$ levels continue to increase 5, EMS will be contacted 6 and given the GPS location of the vehicle in order to ensure that EMS can pinpoint the location in a timely manner.

Figure 2:
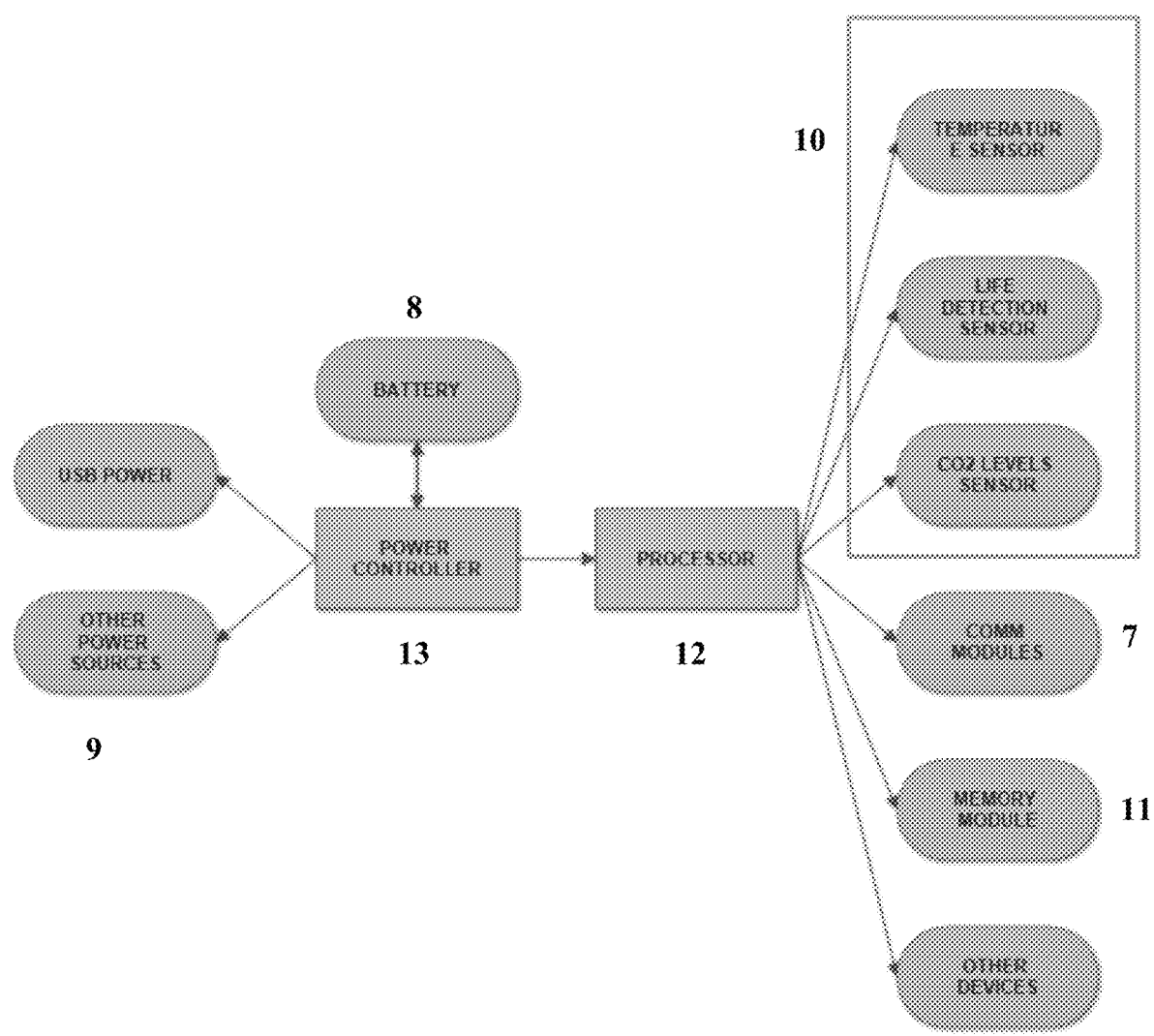
FIG. 2 illustrates a system according to the present disclosure.

Ash shown in FIG. 2, the present invention further comprises several components not directed at detecting life, but at ensuring the system is functional with little or no user intervention.

Exemplary embodiments of the present invention comprise communication modules 7. A cellular breakout is a device that performs the actions of a cellular phone. In essence, it is a mobile phone without all the other attachments like a screen, speakers or buttons. The cellular breakout allows a person to make phone calls, send text messages and connect to the internet, all utilizing a mobile network SIM card. In today's tech world, cellular breakouts are used to connect sensors to the internet in order to access them remotely and transmit information from sensors to specified receivers. In our case, the cellular breakout will be used to send messages alerts to designated caregivers and to contact EMS in the case that a life is in danger. The cellular breakout will have an input for a SIM card which the user will be responsible to obtain and maintain active in order for the system to properly operate. Further embodiments of the present invention may comprise other communication methods, such as Wi-Fi or satellite phones, in case cell phone network coverage is low or inactive.

A lithium ion battery 8 is a battery that is not acid based and there for has a longer life span than traditional batteries. In the case of the present invention, a lithium ion battery that is rechargeable and that can hold a charge and last for long periods of time is preferable. The purpose of using a battery is to be able to make the system fully self-sustained without the need to be connected to the vehicle or minimize the times it will need to be connected to a vehicle charger.

A preferred power sources for the present invention is a small solar panel 9 that converts solar energy into usable AC/DC current that can be used to recharge small batteries. In some embodiments, the present invention may comprise a micro solar panel to maintain a constant power source for charging the lithium ion battery. The micro solar panel will be connected directly to the system where it will have direct sun light and can continue to produce the necessary current to maintain the system charged and functional. In other embodiments, the system can be powered through other sources, such as USB.

A printed circuit board (PCB) is the component to which the processor 12, controller 13, all the sensors 10, battery 8 and micro solar panel 9 are connected. The PCB also houses the processors and memory modules 11 that will perform all the necessary actions to make the system work. The PCB will hold the algorithms that help the sensors communicate and produce the necessary information and data necessary. It will also transmit the messages and alerts to caregivers and EMS via the cellular breakout. In a preferred embodiment, all the components are to be housed inside a case. The case will be designed in a manner that can be attached to a vehicle's windshield and be positioned in an angle that allows it to detect life in the vehicle, to ensure it covers the specified area. The UWB sensor does not necessarily have to be pointed in a specific area to detect motion or movements, but to ensure the waves can penetrate the materials inside the car and properly detects movement, it is preferable to position it at an angle facing the rear of the car. The case will also have a heat shield that will minimize the internal components exposure to heat and rising temperatures.

In a preferred embodiment, the present invention's main form of notification will be over SMS text or prerecorded audio messages to assigned phone numbers. The user will be able to configure phone numbers that can receive alerts in case of an alarm being triggered. These notifications will be sent simultaneously to all the configured phone numbers to assure that the message is received in case someone is out of range or has his/her phone off. After sending the notification, if the conditions in the car remain the same or worsen after a certain amount of time, a second notification will be sent to all the numbers again.

In a further embodiment, if the conditions do not change or get worse, the sensor will contact EMS via 911. This means that if the conditions do not improve over a certain amount of time after the first alert, 911 will be contacted in order to notify that a person or animal has been left alone in a car and the conditions have become dangerous for life. Because not all EMS centers have the capabilities of receiving text messages, it is important that the system includes an alternative to voice calls to communicate with EMS. One option is integrating TTY. TTY is a system that is used for people that can't speak or hear, to communicate with other people through a phone. It uses a system that translates sounds produced by a machine, into words. All EMS centers are equipped with TTY by law.

In a further embodiment, the system has the ability to share its location with EMS using it's built in GPS. This could be done by allowing the EMS center to triangulate the exact location by allowing access to the GPS location, or by providing the actual coordinates with EMS during its communication with the sensor.

Another embodiment of the present invention comprises a small high intensity speaker that can transmit a loud pulsating alarm sound. This audible alarm has several purposes. First, it will call the attention of any people in the immediate vicinity of the car, which can help provide quick help to the person or pet left inside the car. It will also wake up any child or adult that has fallen asleep because of high $CO_2$ levels. Causing them to wake up with a loud noise, might provoke them to open the door and get out. It can also help EMS identify the car with a child, person or pet left inside quickly because the sound will call their attention and if the sound provokes the child to cry or the pet to bark, it can call even more attention. The system may further comprise a push button that can be used to deactivate the alarm once a caregiver reaches the car.

Figure 3:
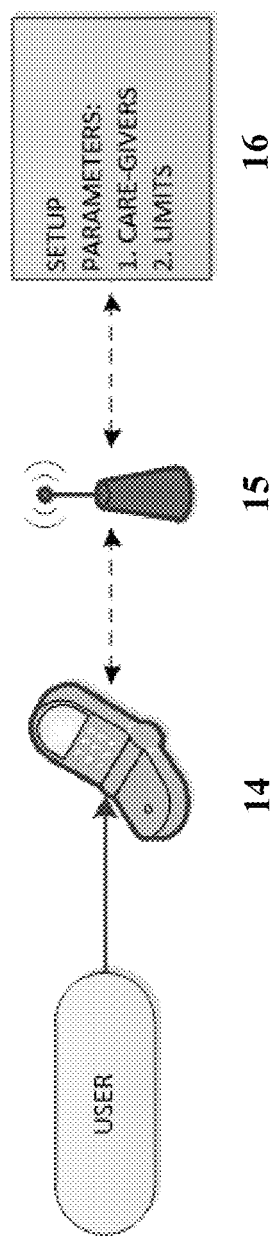
FIG. 3 illustrates the process for configuring a system according to the present disclosure.

As shown in FIG. 3, a further embodiment of the present invention may be configured through an external mobile application running on a smartphone 14. The present invention may be connected to the mobile application via various protocols, such as Bluetooth or Wi-Fi 15. Instructions for setting up the system are displayed on the mobile phone's screen, where a user may input the necessary information, such as caregiver numbers, environment condition parameters, size of the vehicle, etc. 16. A further embodiment of the present invention comprises a screen, allowing the user to configure the system without the need for a mobile phone running an application. The screen prompts the user to enter a car size (which determines the UWB range), phone numbers for caregivers and to insert a SIM card. The screen can also display information about the status of the system, such as current battery level, temperature, time, date, etc.

Further embodiments of the present invention may comprise other sensors, such as a camera to detect movement inside the vehicle or microphones to detect sound or allow the person or animal inside the vehicle talk to the EMS. Artificial intelligence may also be used in an example embodiment to interpret commands spoken to the system by a child, or to identify specific sounds, such as crying or barking, as emergencies.

Additional uses for the present invention include search and rescue by being mounted on a drone to detect life inside a collapsed building and ensuring the environment is safe for rescuers. It may also be used in senior citizen's retirement homes to monitor their environment and take measures in a timely manner in case of an emergency.

While the disclosure includes reference to specific embodiments, it will be understood by those skilled in the art that various changes may be made and equivalents may be substituted for elements thereof without departing from the true spirit and scope of the disclosure. In addition, many modifications may be made without departing from the essential teachings of the disclosure. When reference is made to specific known applications or systems, it will be understood by those skilled in the art that various substitutes and alternatives may be available.

What is claimed:

1. A system for detecting life inside a vehicle, comprising:
   one or more processors;
   one or more memory modules;
   one or more communication modules;
   one or more of primary sensors;
   one or more of secondary sensors;
   wherein said processor is configured to receive one or more sensor measurements;
   wherein said processor is configured to receive one or more sensor measurement parameters;
   wherein said processor is configured to determine if said one or more primary sensors measurements are within said one or more sensor parameters;
   wherein, when said one or more primary sensors measurements are within said one or more sensor parameters, said processor is configured to determine if said one or more secondary sensors measurements are within said one or more sensor parameters;
   wherein, when said one or more secondary sensors measurements are within said one or more sensor parameters, said processor is configured to send, through said one or more communication modules, a first notification to a specified user; and
   wherein, when said one or more secondary sensors measurements are within said one or more sensor parameters and a first notification has been sent to a specified user, said processor is configured to send, through said one or more communication modules, a second notification to an emergency management service.

2. The system according to claim 1, wherein said one or more primary sensors include a GPS.

3. The system according to claim 1, wherein said one or more primary sensors include an accelerometer.

4. The system according to claim 1, wherein said one or more primary sensors include an ultra-wideband sensor.

5. The system according to claim 1, wherein said one or more secondary sensors include a temperature sensor.

6. The system according to claim 1, wherein said one or more secondary sensors include a $CO_2$ sensor.

7. The system according to claim 1, wherein said one or more secondary sensors include an air quality sensor.

8. A method for detecting life inside a vehicle, comprising the steps of:
   establishing acceptable limits for environment conditions inside a vehicle;
   establishing caregiver contacts;
   determining if said vehicle is in movement;
   when said vehicle is not in movement, determining if there is movement inside the vehicle;
   when said vehicle is not in movement and there is movement inside the vehicle, determining if environment conditions inside said vehicle are within the established limits;
   when said vehicle is not in movement, there is movement inside the vehicle, and environment conditions inside the vehicle are not within said established limits, send a first notification to said established caregiver contacts; and
   when said vehicle is not in movement, there is movement inside the vehicle, environment conditions inside the vehicle are not within said established limits after sending a first notification to said established caregiver contacts, sending a notification to an emergency management service.

9. The method as in claim 8, wherein the movement of said vehicle is determined by a GPS module.

10. The method as in claim 8, wherein the movement of said vehicle is determined by an accelerometer.

11. The method as in claim 8, wherein the movement inside of said vehicle is determined by an ultra-wideband sensor.

12. The method as in claim 8, wherein the environment conditions inside said vehicle are determined by a temperature sensor.

13. The method as in claim 8, wherein the environment conditions inside said vehicle are determined by a $CO_2$ sensor.

14. The method as in claim 8, wherein the environment conditions inside said vehicle are determined by an air quality sensor.

* * * * *